United States Patent Office 3,320,144
Patented May 16, 1967

3,320,144
MANUFACTURE OF ETHYL BROMIDE
David E. Harmer, Midland, Mich., assignor to The Dow Chemical Company, Midland, Mich., a corporation of Delaware
No Drawing. Filed Aug. 30, 1962, Ser. No. 220,542
4 Claims. (Cl. 204—163)

This invention relates to the addition of hydrogen bromide to ethylene and it relates specifically to an improvement in conducting this reaction under the influence of high energy ionizing radiation.

The process whereby ethylene is hydrobrominated by reaction with hydrogen bromide has been carried out in both liquid and gaseous phase. Usually, combination of the two reactants dispersed or dissolved in a liquid medium gives most efficient results. Recently it has been found that particularly advantageous results are obtained when the reaction is catalyzed by high energy ionizing radiation and ethyl bromide is employed as the reaction solvent. This process is described in detail in an application filed May 24, 1962, Ser. No. 197,279, now U.S. Patent No. 3,145,155, in the hands of a common assignee. Such processes, although convenient and effective, convert somewhat less than the theoretical 100% of the reactants, even under the most preferred conditions. For example, approximately 3–5% of the hydrogen bromide and ethylene employed in the last-named process remain unreacted using a tower reactor of ordinary dimensions even when the two reactants are present in equal molar proportions under the most advantageous reaction conditions. While this amount of unreacted starting material might be considered unimportant on a small scale, in industrial operation the economy of the process would be significantly affected since any unreacted materials must either be recovered or wasted. Furthermore, these unreacted gases carry with them appreciable quantities of the volatile product and reaction solvent.

It has now been found that essentially quantitative reaction of ethylene and hydrogen bromide is attained in their radiation-catalyzed reaction in inert solvent when the two reactant gases are premixed and allowed to be in intimate contact for a brief but measurable period of time prior to their admission into the reaction zone. The mechanism responsible for these improved results is unknown. It may be that a necessary induction period is thereby provided, but whatever the reason, the process appears to involve a little more than merely better mixing. This is evident from the fact that when the reacting gases are admitted to the reactor in separate streams, a maximum conversion of about 95% is reached and this cannot be significantly exceeded under the best of conditions without employing a reactor of impractically large size. Premixing of the feed gases immediately gives essentially quantitative reaction when using a reactor of conventional design.

The reaction is carried out in a reaction zone filled with an inert solvent such as carbon tetrachloride, methyl chloroform, chlorobenzene, benzene, toluene, hexane, or ethyl bromide itself. Other similar hydrocarbons and halohydrocarbons may be used. Preferably, the solvent is ethyl bromide. The reactants are best employed in stoichiometric mole per mole proportions.

Ionizing radiation sufficient to provide a dose of 5,000 to 10,000,000 rads per hour is the catalytic initiator of the reaction. Suitable high energy ionizing radiation includes beta or gamma radiation from radioactive elements such as cobalt 60 and cesium 137 or nuclear reactor fission products and radiation from a Van de Graaff accelerator, a linear accelerator, or an X-ray generator.

The reaction temperature is suitably about $-20°$ to about $100°$ C. In order to operate at the preferred atmospheric pressure level, a temperature of $-20$ to $20°$ C. is most preferred. Superatmospheric pressure may be used if desired.

The time necessary for essentially complete reaction varies according to the conditions. Under preferred conditions, retention of the reactants in the reaction zone for a few seconds is sufficient.

The process is most conveniently operated in a continuous manner using ethyl bromide as the reaction medium wherein the product may be drawn from the reactor substantially as it is formed, then washed and dried to obtain a pure product. Distillation under these conditions is usually not necessary.

The example illustrates a preferred application of the process as compared to another mode of operation.

*Example*

A glass column reactor of about 550 ml. capacity was placed in the radiation field of a cobalt 60 source in a location such that the contents of the reactor would receive a dose of 156 kilorads per hours. The reactor was filled with liquid ethyl bromide and the system was maintained at $0°$ C. by a circulating refrigeration system. Hydrogen bromide and ethylene were passed through separate spargers into the reactor at the respective rates of 398 g. per hour and 138 g. per hour, these rates representing stoichiometric proportions of the two reactants. After an induction period during which essentially no reaction occurred, yields of ethyl bromide were obtained and were measured by weighting of carefully timed sample of product overflowing from the reactor top. After about three hours of operation, the reaction had reached equilibrium conditions wherein 96.5% conversion of the reactants was obtained, the remaining unreacted ethylene and hydrogen bromide passing off from the top of the reactor and carrying with them small amounts of ethyl bromide vapor.

At this point, the gaseous feed was switched to a premixed feed wherein the two reactant gas streams were combined and thoroughly mixed before being admitted to the reactor through the same two sparging tubes previously used by the separate streams, the other reaction conditions being maintained as before. The combining and mixing device consisted of a glass test tube having an inlet tube extending from the top nearly to the bottom of the test tube and an outlet situated near the top. Turbulent flow of the reactant gases through this device caused thorough mixing and the gases were in intimate contact for an appreciable time before being admitted into the reaction zone. The improvement in conversion caused by this change was at once apparent from the fact that the former steady flow of bubbles to the top of the reactor stopped abruptly and essentially no gaseous material was passed. Weighing of timed samples as before indicated that conversion was quantitative within an experimental error of a few tenths of a percent.

Similar results are obtained with other mixing devices so long as those provide good mixing and contact of the mixed gases for a measurable period of time before admission to the reaction zone. For example, a common reactor inlet tube of sufficient length to give thorough mixing is suitable. Preferably, conditions are such as to cause turbulent flow of the mixing gases.

Solvents other than ethyl bromide as set forth above can also be used to obtain results as shown in the example. However, a distillation step is then required to separate ethyl bromide from the reactor effluent.

I claim:

1. In a process for making ethyl bromide which comprises contacting ethylene and hydrogen bromide in a reaction zone filled with an inert solvent at about −20° to about 100° C. in the presence of a field of high energy ionizing radiation of 5,000–10,000,000 rads per hour intensity, the improvement which consists of intimately mixing said ethylene and said hydrogen bromide prior to their introduction into said reaction zone.

2. The process of claim 1 wherein the inert solvent is ethyl bromide.

3. The process of claim 2 wherein the ethylene and hydrogen bromide are mixed in essentially stoichiometric proportions.

4. The process of claim 2 wherein the temperature is −20° C. to 20° C.

References Cited by the Examiner

UNITED STATES PATENTS

| 2,307,552 | 1/1943 | Vaughan et al. | 204—163 |
| 2,398,481 | 4/1946 | Vaughan et al. | 204—163 |
| 2,473,162 | 6/1949 | McBee et al. | 204—163 |
| 2,899,370 | 8/1959 | Rosenberg | 204—163 |
| 2,925,369 | 2/1960 | Grabiet et al. | 204—163 |
| 3,026,257 | 3/1962 | Wilkinson et al. | 204—163 |
| 3,145,155 | 8/1964 | Pumpelly et al. | 204—163 |

OTHER REFERENCES

Bourne et al.: "Chem. and Ind.," Nov. 24, 1956, pages 1372–76.

Martin: "Chem. and Eng. News," vol. 33 (April 1955), pages 1424–28.

JOHN H. MACK, *Primary Examiner.*

MURRAY TILLMAN, *Examiner.*

H. S. WILLIAMS, *Assistant Examiner.*